US006420673B1

(12) United States Patent
Nemchinsky

(10) Patent No.: US 6,420,673 B1
(45) Date of Patent: Jul. 16, 2002

(54) POWDERED METAL EMISSIVE ELEMENTS

(75) Inventor: Valerian Nemchinsky, Florence, SC (US)

(73) Assignee: The ESAB Group, Inc., Florence, SC (US)

(*) Notice: Subject to any disclaimer, the term of this patent is extended or adjusted under 35 U.S.C. 154(b) by 0 days.

(21) Appl. No.: 09/789,115

(22) Filed: Feb. 20, 2001

(51) Int. Cl.[7] ................................................ B23K 10/00

(52) U.S. Cl. ............... 219/121.52; 219/75; 219/121.59; 219/121.5; 313/231.3

(58) Field of Search ........................ 219/121.52, 121.59, 219/121.48, 74, 75; 313/231.31, 231.41, 627–632

(56) References Cited

U.S. PATENT DOCUMENTS

| | | | | |
|---|---|---|---|---|
| 3,198,932 A | | 8/1965 | Weatherly | |
| 3,930,139 A | | 12/1975 | Bykhovsky et al. | |
| 4,056,644 A | | 11/1977 | Howard et al. | |
| 4,304,984 A | | 12/1981 | Bolotnikov et al. | |
| 4,766,349 A | * | 8/1988 | Johansson et al. | 219/121.52 |
| 4,843,206 A | | 6/1989 | Azuma et al. | |
| 5,021,627 A | | 6/1991 | Bersch et al. | |
| 5,023,425 A | | 6/1991 | Severance, Jr. | |
| 5,097,111 A | | 3/1992 | Severance, Jr. | |
| 5,200,594 A | | 4/1993 | Okada et al. | |
| 5,628,924 A | | 5/1997 | Yoshimitsu et al. | |
| 5,676,864 A | | 10/1997 | Walters | |
| 5,767,478 A | | 6/1998 | Walters | |
| 5,908,567 A | | 6/1999 | Sakuragi et al. | |
| 5,911,919 A | | 6/1999 | Billings | |
| 6,020,572 A | | 2/2000 | Marner et al. | |
| 6,130,399 A | * | 10/2000 | Lu et al. | 219/121.59 |
| 6,177,647 B1 | * | 1/2001 | Zapletal | 219/121.52 |

* cited by examiner

*Primary Examiner*—Mark Paschall
(74) *Attorney, Agent, or Firm*—Alston & Bird LLP

(57) ABSTRACT

An electrode for a plasma arc torch and method of fabricating the same are disclosed, and wherein the electrode comprises a copper holder defining a cavity in a forward end. An emissive element and separator assembly is positioned in the cavity. The emissive element is formed from the powders of at least two materials, and the separator includes a material that is substantially similar to one of the materials forming the emissive element. The emissive element is heated and a plurality of thermal conductive paths are formed that extend from within the emissive element to the separator that improve the thermal conductivity of the electrode.

29 Claims, 6 Drawing Sheets

POWDERED METAL EMISSIVE ELEMENTS

FIELD OF THE INVENTION

The present invention relates to plasma arc torches and, more particularly, to an electrode for supporting an electric arc in a plasma arc torch.

BACKGROUND OF THE INVENTION

Plasma arc torches are commonly used for the working of metals, including cutting, welding, surface treatment, melting, and annealing. Such torches include an electrode which supports an arc which extends from the electrode to the workpiece in the transferred arc mode of operation. It is also conventional to surround the arc with a swirling vortex flow of gas, and in some torch designs it is conventional to also envelop the gas and arc with a swirling jet of water.

The electrode used in conventional torches of the described type typically comprises a metallic tubular member composed of a material of high thermal conductivity, such as copper or a copper alloy. The forward or discharge end of the tubular electrode includes a bottom end wall having an emissive insert embedded therein which supports the arc. The insert is composed of a material which has a relatively low work function, which is defined in the art as the potential step, measured in electron volts (ev), which permits thermionic emission from the surface of a metal at a given temperature. In view of its low work function, the insert is thus capable of readily emitting electrons when an electrical potential is applied thereto. Commonly used emissive materials include hafnium, zirconium, tungsten, and their alloys.

A problem associated with torches of the type described above is the short service life of the electrode, particularly when the torch is used with an oxidizing gas, such as oxygen or air. More specifically, the emissive insert erodes during operation of the torch, such that a cavity or hole is defined between the emissive insert and the metallic holder. When the cavity becomes large enough, the arc "jumps" or transfers from the emissive insert to the holder, which typically destroys the electrode. To prevent or at least impede the arc from jumping to the metallic holder, some electrodes include a relatively non-emissive separator that is disposed between the emissive insert and the metallic holder. Separators are disclosed in U.S. Pat. No. 5,023,425, which is assigned to the assignee of the present invention and incorporated herein by reference.

U.S. Pat. No. 3,198,932 discloses an electrode for use in a plasma arc torch that attempts to improve the longevity of the electrode and thus the performance of the torch. In this regard, the '932 patent discloses electrodes having emissive inserts formed from powdered materials, such as zirconium, lanthanum, thorium, or strontium. In addition, silver powder can be added to the powdered materials, which improves the heat transfer from the emissive insert without substantially increasing the work function. The emissive insert is inserted into the holder, which is typically formed of copper, but can also be formed from silver.

Another method used in forming conventional torches as mentioned by the '932 patent provides securing the emissive insert in the holder by way of brazing. According to this method, the temperature of the brazing material, which is typically silver alloy, is raised to its melting point in order to braze the emissive insert to the copper holder. However, brazing requires an additional manufacturing step and involves the addition of expensive material to the finished electrode.

Thus, it is desirable to retain the benefits of using powdered materials to form the emissive element of a plasma arc torch electrode. It is also desirable to further improve the thermal conductivity of the electrode. It is also desirable to improve thermal conductivity of the emissive element without using a brazing process. Yet it is also desirable to maintain a strong bond between the emissive element and the holder.

SUMMARY OF THE INVENTION

The present invention was developed to improve upon conventional electrodes and methods of making electrodes, and more particularly electrodes and methods of making electrodes disclosed in the above-referenced '932 patent. It has been discovered that the difficulties of the electrodes described above, namely improving the thermal and electrical conductivity of electrodes having powdered metal emissive elements, can be overcome by providing an electrode having thermal conductive paths extending from within the emissive element to a separator positioned between the emissive element and a metallic holder.

This is accomplished by providing an emissive element comprising powders of at least two materials, and a separator that is formed of a material that, according to one embodiment, is substantially similar to one of the materials forming the emissive element. This assembly is inserted in a metallic holder, such as a copper holder, and heated to a temperature such that thermal conductive paths are formed within the emissive element and extend to the separator. After the heating process, the materials of the emissive element have distinct phases, and at least part of the phase of the second material is arranged within the emissive element to form thermal and electrical conductive paths from within the emissive element to the separator. Advantageously, the thermal conductive paths are formed of the material common to both the emissive element and the separator, although the thermal conductive paths can be formed from two or more materials. In one embodiment, the emissive element comprises powders of silver and hafnium, the separator comprises silver, and the thermal conductive paths are formed of silver. It is also possible to add dopants, such as lanthanum oxide, in order to further improve the emissivity of the electrode. The thermal conductive paths improve the performance of the electrode by conducting heat generated by the arc from the emissive element to the separator at a rate greater than electrodes not having thermal conductive paths.

Methods of forming an electrode according to the present invention are also provided. In a presently preferred embodiment, powders from at least two different materials are mixed together, at least one of the materials being emissive. The mixture is deposited within an opening in a separator formed from a relatively non-emissive, electrically and thermally conductive material, such as silver. More specifically, the deposited mixture is compressed into the opening defined by the separator to not less than 60% theoretical (100% theoretical being defined as a solid material having no voids present therein), and preferably to about 80%–90% theoretical.

The combination is heated to define a unitary emissive element bonded to the separator. In particular, the mixture is heated to cause a type of diffusion bonding to take place between the emissive element and the separator. The diffusion bonding results in the formation of the thermal conductive paths between the emissive element and the separator. For example, where the first powdered material comprises hafnium and the second material comprises silver, it is sufficient to heat the mixture to approximately 1400° F. to achieve the diffusion bonding and form the thermal conductive paths.

Thus, the present invention provides an electrode and method of making an electrode having improved heat transfer properties over conventional plasma arc torches. By heating powdered materials to form thermal conductive paths between the emissive element and the separator, the emissive element and separator form a relatively strong bond therebetween while improving the thermal conductivity between the emissive element and the separator. In addition, by using a separator being formed of a material substantially similar to one of the powdered materials present in the emissive element, the cost of the electrode is reduced compared to providing an entire metallic holder formed from the same material.

BRIEF DESCRIPTION OF THE DRAWINGS

Figure 1:
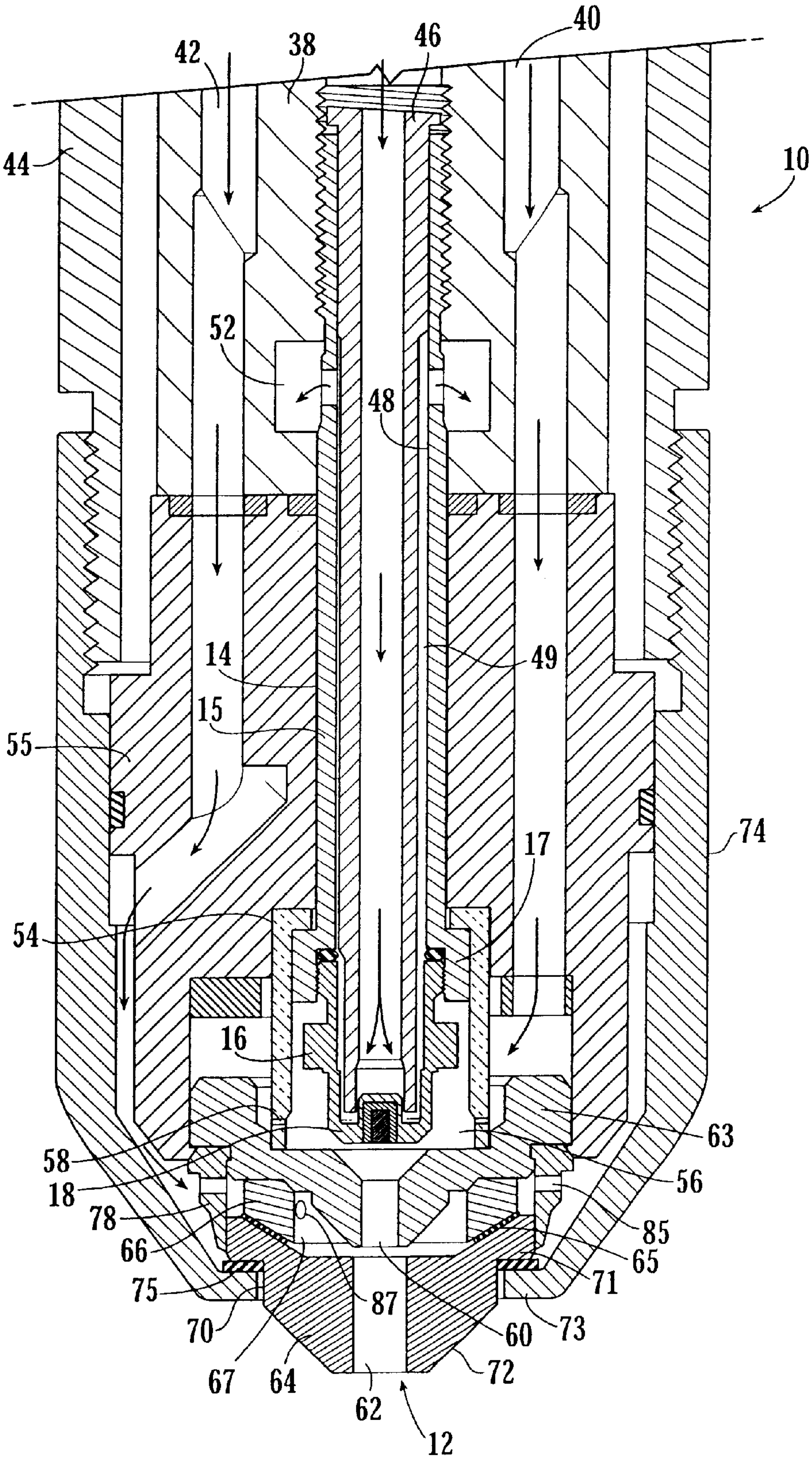
Figure 2:
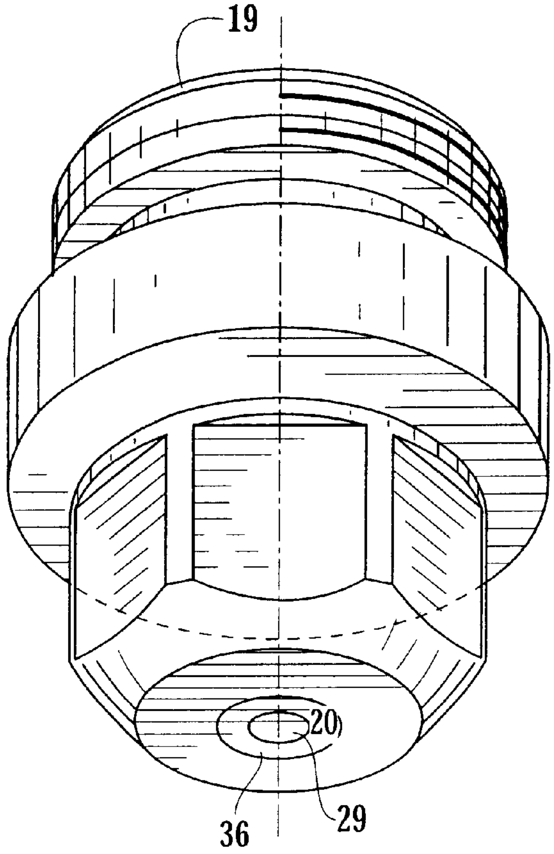
Figure 3:
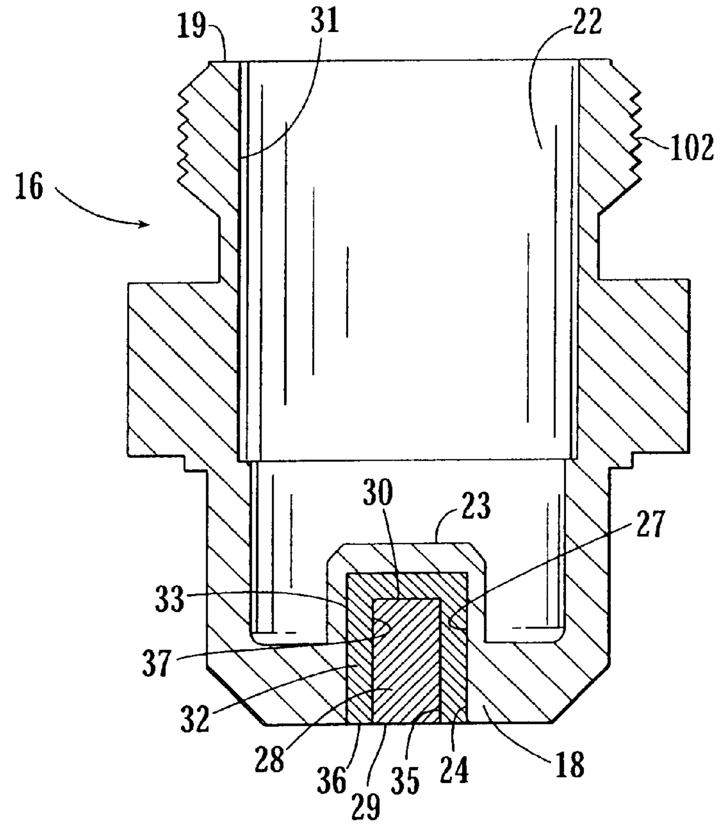
Figure 7:
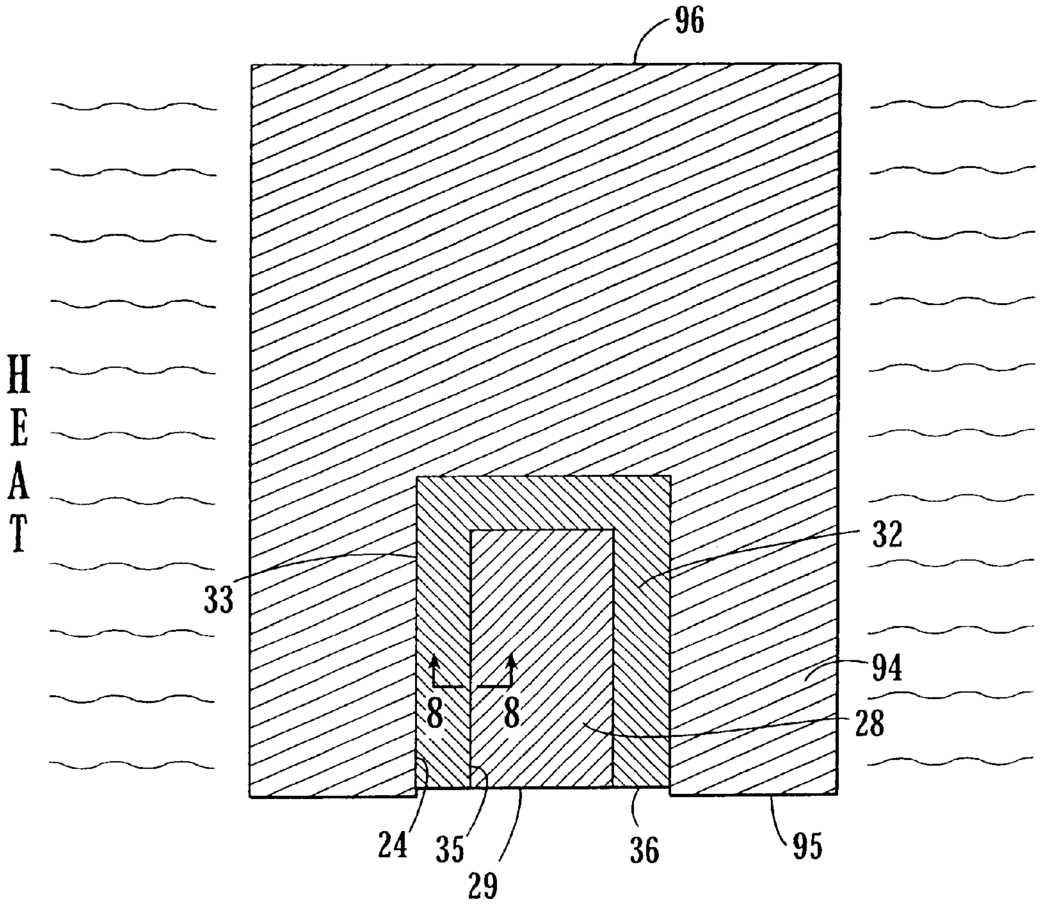
Figure 8:
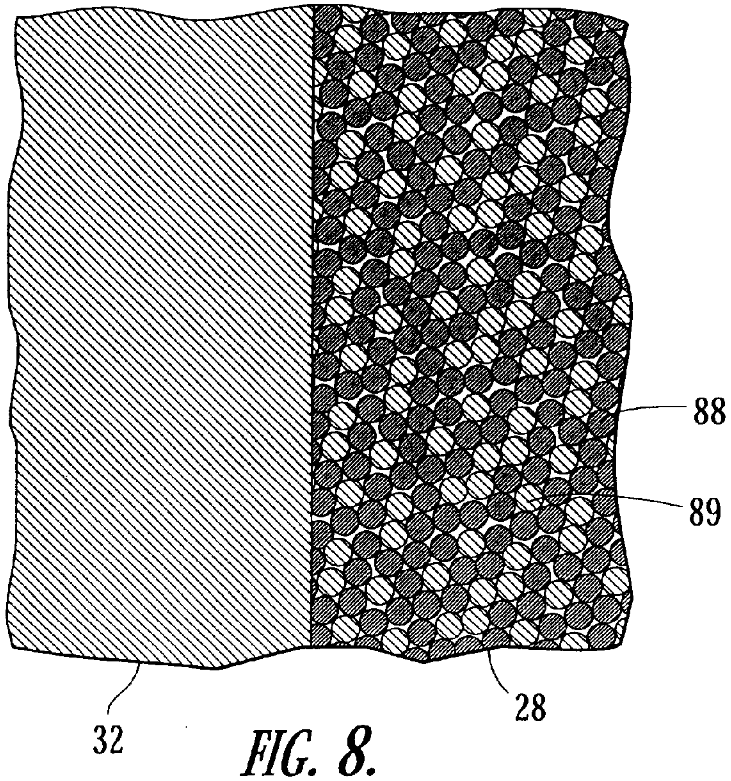
Figure 9:
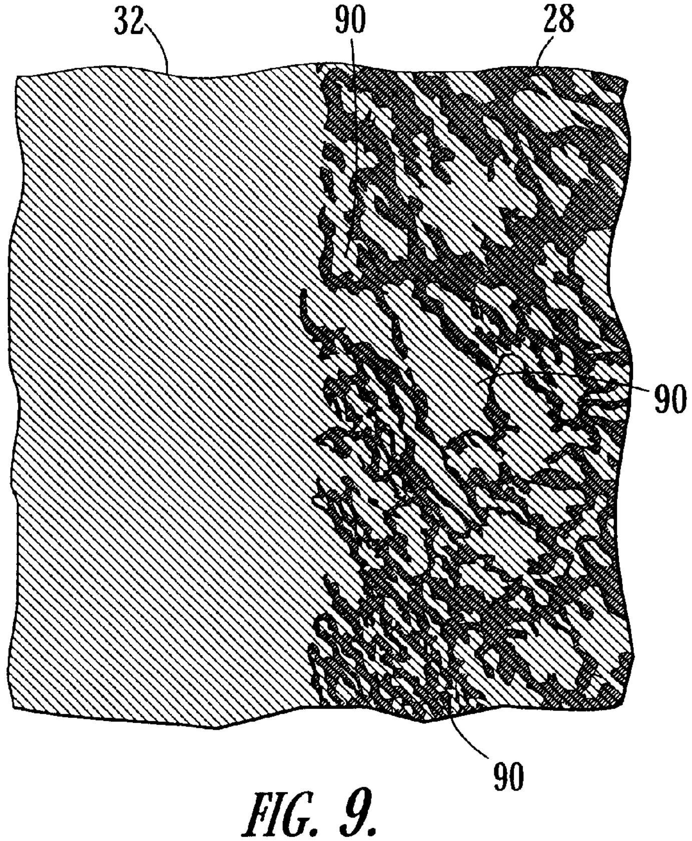
Figure 10:
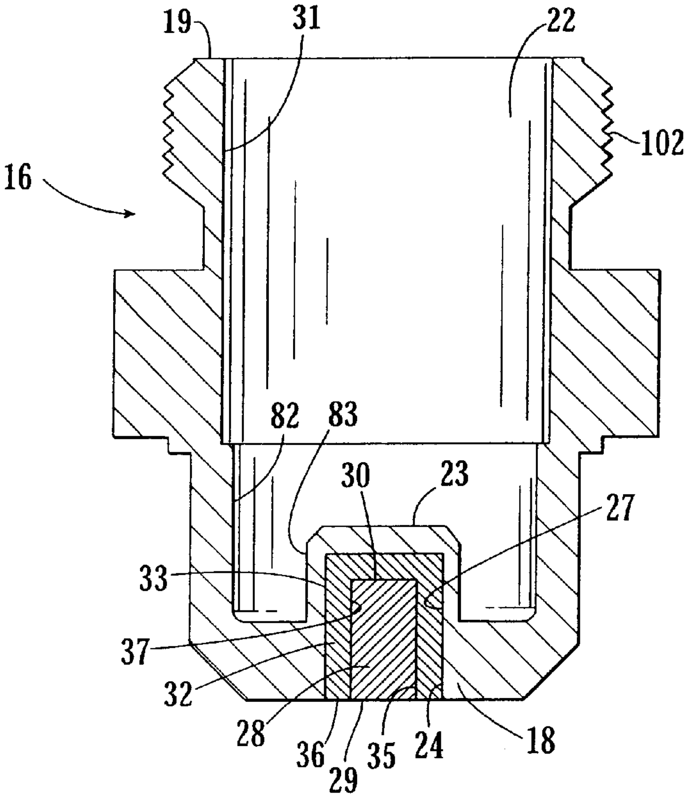
Figure 11:
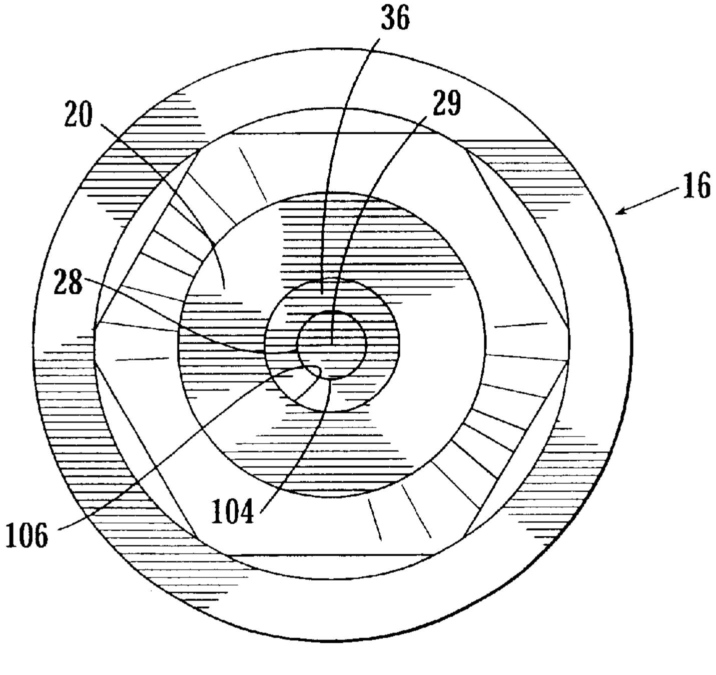

Having thus described the invention in general terms, reference will now be made to the accompanying drawings, which are not necessarily drawn to scale, wherein:

FIG. 1 is a sectioned side elevational view of a plasma arc torch which embodies the features of the present invention;

FIG. 2 is an enlarged perspective view of an electrode in accordance with the present invention;

FIG. 3 is an enlarged sectional side view of an electrode in accordance with the present invention;

FIGS. 4–7 are schematic views illustrating the steps of a preferred method of fabricating the electrode in accordance with the invention;

FIG. 8 is a greatly enlarged sectional view of the electrode of the present invention as seen along lines 8—8 of FIG. 7 shortly before the pressing and heating operations;

FIG. 9 is a greatly enlarged sectional view of the electrode of the present invention as seen along lines 8—8 of FIG. 7 shortly after the pressing and heating operations;

FIG. 10 is an enlarged sectional side view of an electrode in accordance with the present invention; and FIG. 11 is an end elevational view of the finished electrode in accordance with the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIGS. 1–3, a plasma arc torch 10 embodying the features of the present invention is depicted. The torch 10 includes a nozzle assembly 12 and a tubular electrode 14. The electrode 14 preferably is made of copper or a copper alloy, and is composed of an upper tubular member 15 and a lower cup-shaped member or holder 16. The upper tubular member 15 is of elongate open tubular construction and defines the longitudinal axis of the torch 10. The upper tubular member 15 includes an internally threaded lower end portion 17. The holder 16 is also of tubular construction, and includes a lower front end and an upper rear end. A transverse end wall 18 closes the front end of the holder 16, and the transverse end wall 18 defines an outer front face 20. The rear end of the holder 16 is externally threaded and is threadedly joined to the lower end portion 17 of the upper tubular member 15.

The holder 16 is open at the rear end 19 thereof such that the holder is of cup-shaped configuration and defines an internal cavity 22. The internal cavity 22 has a surface 31 that includes a cylindrical post 23 extending into the internal cavity along the longitudinal axis. A generally cylindrical cavity 24 is formed in the front face 20 of the end wall 18 and extends rearwardly along the longitudinal axis and into a portion of the holder 16. The cavity 24 includes inner side surface 27.

A relatively non-emissive separator 32 is positioned in the cavity 24 and is disposed coaxially along the longitudinal axis. The separator 32 has an outer peripheral wall 33 extending substantially the length of the cavity 24. The peripheral wall 33 is illustrated as having a substantially constant outer diameter over the length of the separator, although it will be appreciated that other geometric configurations would be consistent with the scope of the invention, such as frustoconical. The separator 32 also defines an internal cavity 35 having a surface 37. The separator 32 also includes an outer end face 36 which is generally flush with the front face 20 of the holder 16.

An emissive element or insert 28 is positioned in the separator 32 and is disposed coaxially along the longitudinal axis. More specifically, the emissive element 28 is secured to the separator 32 by an interference or press fit coupled with an advantageous form of diffusion bonding, which is effected by heating the separator and emissive element. The emissive element 28 has a circular outer end face 29 lying in the plane of the front face 20 of the holder 16 and the outer end face 36 of the separator 32. The emissive element 28 also includes a generally circular inner end face 30 which is disposed in the cavity 35 defined by the separator 32 and is opposite the outer end face 29. The inner end face 30, however, can have other shapes, such as pointed, polygonal, or spherical, in order to assist in securing the emissive element to the separator 32. In addition, the diameter of the emissive element 28 is about 30–80 percent of the outer diameter of the end face 36 of the separator 32, which has a radial thickness of at least about 0.25 mm (0.01 inch) at the outer end face 36 and along its entire length. As a specific example, the emissive element 28 typically has a diameter of about 0.08 inch and a length of about 0.25 inch, and the outer diameter of the separator 32 is about 0.25 inch.

The emissive element 28 is composed of powders of at least two materials, one of which is known to be a good emitter. Suitable examples of such materials are hafnium, zirconium, tungsten, and mixtures thereof. One of the materials forming the emissive element 28 must also have a relatively greater thermal conductivity, and preferably a relatively greater electrical conductivity as well, compared to the other materials forming the emissive element. Preferably, this material is substantially similar to the material forming the separator 32, as discussed more fully below.

Other materials may also be present in the emissive element 28, particularly materials that increase the emissivity of the electrode during operation of the plasma arc torch. These emission enhancing materials, known as dopants, can be added in small amounts, such as between 0.1–10.0% of the total weight composition of the emissive element. Presently preferred dopants are lanthanum oxide, cerium oxide, yttrium oxide, calcium oxide, strontium oxide, barium oxide, and mixtures thereof. Other dopants can also be used to achieve similar benefits, although the oxides mentioned above are known to have relatively high melting temperatures and/or other beneficial qualities.

The separator 32 is composed of a metallic material that less readily supports the arc compared to the holder 16 and the emissive element 28. In a preferred embodiment, the separator 32 comprises silver as the primary material, although other metallic materials, such as gold, platinum, aluminum, rhodium, iridium, palladium, nickel, and alloys thereof, may also be used. As mentioned above, the selection of the material forming the separator 32 is preferably substantially similar to one of the powdered materials forming the emissive element 28, although this is not necessary.

For example, in one particular embodiment of the present invention, the separator 32 is composed of a silver alloy material comprising silver alloyed with about 0.25 to 10 percent of an additional material selected from the group consisting of copper, aluminum, iron, lead, zinc, and alloys thereof. The additional material may be in elemental or oxide form, and thus the term "copper" as used herein is intended to refer to both the elemental form as well as the oxide form, and similarly for the terms "aluminum" and the like. The emissive element 28 in this example also includes silver powder that is substantially similar to the silver comprising the separator 32. The term "substantially similar" is defined as being similar enough so that heating the material can result in the formation of thermal conductive paths 90 (FIG. 9), which are discussed below. For example, pure silver and sterling silver are considered substantially similar according to the present invention. Although the thermal conductive paths 90 are preferably formed of a substantially similar material, the thermal conductive paths can be formed from two different materials, such as any combination of the materials described herein for the emissive element 28 and the separator 32.

With reference again to FIG. 1, the electrode 14 is mounted in a plasma torch body 38, which includes gas and liquid passageways 40 and 42, respectively. The torch body 38 is surrounded by an outer insulated housing member 44. A tube 46 is suspended within the central bore 48 of the electrode 14 for circulating a liquid cooling medium, such as water, through the electrode 14. The tube 46 has an outer diameter smaller than the diameter of the bore 48 such that a space 49 exists between the tube 46 and the bore 48 to allow water to flow therein upon being discharged from the open lower end of the tube 46. The water flows from a source (not shown) through the tube 46, inside the internal cavity 22 and the holder 16, and back through the space 49 to an opening 52 in the torch body 38 and to a drain hose (not shown). The passageway 42 directs injection water into the nozzle assembly 12 where it is converted into a swirling vortex for surrounding the plasma arc, as further explained below. The gas passageway 40 directs gas from a suitable source (not shown), through a gas baffle 54 of suitable high temperature material into a gas plenum chamber 56 via inlet holes 58. The inlet holes 58 are arranged so as to cause the gas to enter in the plenum chamber 56 in a swirling fashion. The gas flows out of the plenum chamber 56 through coaxial bores 60 and 62 of the nozzle assembly 12. The electrode 14 retains the gas baffle 54. A high-temperature plastic insulator body 55 electrically insulates the nozzle assembly 12 from the electrode 14.

The nozzle assembly 12 comprises an upper nozzle member 63 which defines the first bore 60, and a lower nozzle member 64 which defines the second bore 62. The upper nozzle member 63 is preferably a metallic material, and the lower nozzle member 64 is preferably a metallic or ceramic material. The bore 60 of the upper nozzle member 63 is in axial alignment with the longitudinal axis of the torch electrode 14. The lower nozzle member 64 is separated from the upper nozzle member 63 by a plastic spacer element 65 and a water swirl ring 66. The space provided between the upper nozzle member 63 and the lower nozzle member 64 forms a water chamber 67.

The lower nozzle member 64 comprises a cylindrical body portion 70 that defines a forward or lower end portion and a rearward or upper end portion, with the bore 62 extending coaxially through the body portion 70. An annular mounting flange 71 is positioned on the rearward end portion, and a frustoconical surface 72 is formed on the exterior of the forward end portion coaxial with the second bore 62. The annular flange 71 is supported from below by an inwardly directed flange 73 at the lower end of the cup 74, with the cup 74 being detachably mounted by interconnecting threads to the outer housing member 44. A gasket 75 is disposed between the two flanges 71 and 73.

The bore 62 in the lower nozzle member 64 is cylindrical, and is maintained in axial alignment with the bore 60 in the upper nozzle member 63 by a centering sleeve 78 of any suitable plastic material. Water flows from the passageway 42 through openings 85 in the sleeve 78 to the injection ports 87 of the swirl ring 66, which injects the water into the water chamber 67. The injection ports 87 are tangentially disposed around the swirl ring 66, to impart a swirl component of velocity to the water flow in the water chamber 67. The water exits the water chamber 67 through the bore 62.

A power supply (not shown) is connected to the torch electrode 14 in a series circuit relationship with a metal workpiece, which is usually grounded. In operation, a plasma arc is established between the emissive element 28 of the electrode, which acts as the cathode terminal for the arc, and the workpiece, which is connected to the anode of the power supply and is positioned below the lower nozzle member 64. The plasma arc is started in a conventional manner by momentarily establishing a pilot arc between the electrode 14 and the nozzle assembly 12, and the arc is then transferred to the workpiece through the bores 60 and 62.

Method of Fabrication

Figure 4:
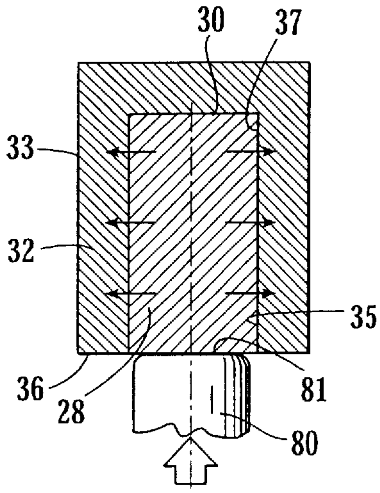

The invention also provides a simplified method for fabricating an electrode of the type described above. FIGS. 4–7 illustrate a preferred method of fabricating the electrode in accordance with the present invention. As shown in FIG. 4, the emissive element 28, which is comprised of the powders of at least two materials, is disposed in the cavity 35 defined by the separator 32. The powdered materials may be disposed in the cavity 35 as loose powder, but preferably the powders are pre-mixed and formed into a cylindrical pellet or the like. In particular, the powdered materials forming the emissive element 28 are compacted in the cavity 35 using a tool 80 having a generally planar circular working surface 81. The tool 80, which is capable of exerting pressure of up to 750,000 psi, is placed with the working surface 81 in contact with the powdered materials in the cavity 35. The outer diameter of the working surface 81 is slightly smaller than the diameter of the cavity 35 defined by the separator 32. The tool 80 is held with the working surface 81 generally coaxial with the longitudinal axis of the torch 10, and force is applied to the tool so as to impart axial compressive forces to the powdered materials and the separator 32 along the longitudinal axis. For example, the tool 80 may be positioned in contact with the powdered materials and separator 32 and then struck by a suitable device, such as the ram of a machine. Regardless of the specific technique used, sufficient force is imparted so as to compress the powdered material mixture to not less than 60% of theoretical density, and preferably to about 80%–90% of theoretical density, which results in the emissive element 28. In one embodiment, the tool 80 exerts about 500,000 psi against the powdered materials. The compressing action of the powdered mixture also results in the mixture and the separator 32 being slightly deformed radially outwardly such that the emissive element 28 is tightly gripped and retained by the separator.

Figure 5:
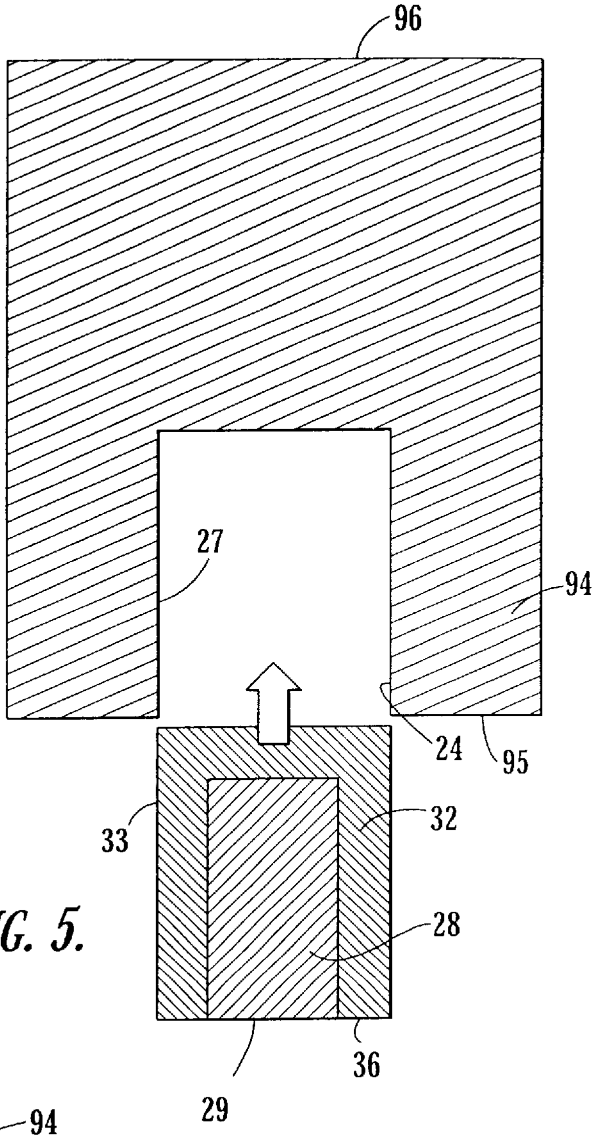

Turning to FIG. 5, a cylindrical blank 94 of copper or copper alloy is provided having a front face 95 and an opposite rear face 96. A generally cylindrical bore is then formed, such as by drilling, in the front face 95 along the longitudinal axis so as to form the cavity 24 as described above. The emissive element 28 and separator 32 assembly is then inserted into the cavity 24, such as by press-fitting, such that the peripheral wall 33 of the separator slidably engages the inner wall 27 of the cavity and is secured thereto. Other methods of securing the emissive element 28 and separator 32 assembly into the cavity 24 can also be used, such as crimping, radially compressing, or utilizing electromagnetic energy.

Figure 6:
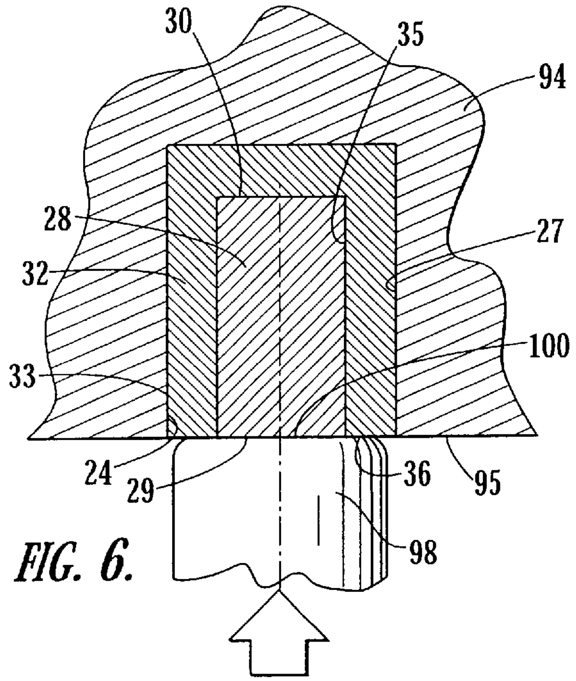

According to one embodiment shown in FIG. 6, a tool 98 having a generally planar circular working surface 100 is placed with the working surface in contact with the end faces 29 and 36 of the emissive element 28 and separator 32, respectively. The outer diameter of the working surface 100 is slightly smaller than the diameter of the cavity 24 in the cylindrical blank 94. The tool 98 is held with the working surface 100 generally coaxial with the longitudinal axis of the torch 10, and force is applied to the tool so as to impart axial compressive forces to the emissive element 28 and the separator 32 along the longitudinal axis. For example, the tool 98 may be positioned in contact with the emissive element 28 and separator 32 and then struck by a suitable device, such as the ram of a machine. Regardless of the specific technique used, sufficient force is imparted so as to cause the emissive element 28 and the separator 32 to be deformed radially outwardly such that the emissive element is tightly gripped and retained by the separator, and the separator is tightly gripped and retained by the cavity 24, as shown in FIG. 7.

FIG. 7 also shows the addition of heat to the cylindrical blank 94, which results in improved properties and life span of the electrode. The heating process could also be performed to the emissive element 28 and separator 32 assembly before inserting the assembly in the cylindrical blank 94, or after further machining steps are performed on the cylindrical blank as described below. The exact heating process is dependent on the powdered materials used in the emissive element 28 and the material used in the separator 32. In particular, the heating process is determined by the melting temperature of the powdered materials.

For example, in one advantageous embodiment the emissive element 28 is formed of hafnium and silver powders in a 2/1 ratio. Hafnium has a melting temperature of about 4040° F., and silver has a melting temperature of about 1761° F. A small percentage of lanthanum oxide is also added, such as about 5% of the total composition of the emissive element 28. The separator 32 is formed of silver. After the emissive element 28 and separator 32 assembly is positioned in the cavity 24, the assembly is heated to a temperature of about 1400° F., which forms unique paths for transferring heat and current, while further securing the emissive element 28 to the separator 32. Higher or lower temperatures may also be used.

FIGS. 8 and 9 show detailed cross-sectional views of the emissive element 28 and the separator 32 before and after the pressing and heating operations. Specifically, FIG. 8 shows a greatly enlarged view of the interface between the emissive element 28 and the separator 32 along lines 8—8 in FIG. 7. In a presently preferred embodiment, the emissive element 28 is formed primarily of the powders of two materials, such as hafnium and silver in a 2/1 ratio. Hafnium powder granules 88 and silver powder granules 89 occupy the cavity 35 defined by the separator 32. The granules 88, 89 have a diameter of about 1–10 microns, and preferably less than about 3 microns. A small amount of lanthanum oxide, such as about 5%, can also be added to the powder granules 88, 89.

FIG. 9 shows the same detailed cross-sectional view of the emissive element 28 and the separator 32 along lines 8—8 of FIG. 7 after the pressing and heating operations according to a preferred embodiment of the present invention. As can be seen, the powdered materials of the emissive element 28 have distinct phases, and at least part of the phase of the silver powder granules 89 is arranged in the emissive element to form thermal conductive paths 90 from within the emissive element to the separator 32. In a preferred embodiment, the thermal conductive paths 90 are formed substantially of silver and, as such, also provide electrical conductive paths between the emissive element 28 and the separator 32. Other materials may also be used to form the thermal conductive paths 90, such as gold, platinum, rhodium, iridium, palladium, aluminum, nickel, and combinations thereof. In a preferred embodiment, the material forming the thermal conductive paths 90 is common to both the emissive element 28 and the separator 32, or at least be substantially similar materials in the emissive element and the separator.

The following table presents conventional and experimental data showing the effects of the diameter of the emissive element 28, the percentage of dopant used (in this case, lanthanum oxide), and the method of forming the electrode in determining the operational life span of the electrode. Note that the term “P” in the Material column represents forming the electrode by pressing the powders of the emissive element into a die to form a pellet, pressing the formed pellet into a silver separator, and then pressing the combination into a copper holder. Further note that the term “N” in the Material column represents forming the electrode by pressing the powders of the emissive element directly in the silver separator, and then pressing the combination in the copper holder. Although no significant life span changes were noted between the two methods of forming the electrode, the data is presented for clarification purposes. As shown in the table, the experimental data show significant improvements in life span over conventional electrodes. The testing conditions used to collect the data in the following table were: an ESAB PT-15 water-injection torch with oxygen as the cutting gas. Thirty (30) second cuts were made at 360 Amps, and the flow rate of the cutting gas was 100 cfh.

| TYPE | DIAM. | DOPANT % | MAT'L. | LIFE (min.) |
|---|---|---|---|---|
| CONVEN. | 0.080 | N/A | Hf rod | 141 |
| CONVEN. | 0.080 | N/A | Hf rod | 134 |
| CONVEN. | 0.080 | N/A | Hf rod | 122 |
| CONVEN. | 0.080 | N/A | Hf rod | 142 |
| EXPER. | 0.081" | 5% | N | 288 |
| EXPER. | 0.081" | 5% | N | 300 |
| EXPER. | 0.081" | 5% | N | 370 |
| EXPER. | 0.096" | 5% | N | 276 |
| EXPER. | 0.111" | 5% | N | 272 |
| EXPER. | 0.111" | 5% | P | 220 |
| EXPER. | 0.111" | 5% | P | 326 |
| EXPER. | 0.111" | 5% | P | 297 |
| EXPER. | 0.111" | 10% | P | 196 |
| EXPER. | 0.111" | 10% | P | 288 |
| EXPER. | 0.111" | 10% | P | 0 (test error) |
| EXPER. | 0.111" | 10% | P | 251 |
| EXPER. | 0.081" | 0% | N | 0 |
| EXPER. | 0.081" | 0% | N | 0 |

FIG. 10 is a cross-sectional view of a completed electrode according to the present invention. To complete the fabrication of the holder 16, the rear face 96 of the cylindrical blank 94 is machined to form an open cup-shaped configuration defining the cavity 22 therein. Advantageously, the cavity 22 includes an internal annular recess 82 which defines the cylindrical post 23 and coaxially surrounds portions of the separator 32 and emissive element 28. In addition, the internal annular recess 82 includes an internal surface 83. In other words, the internal annular recess 82 is formed, such as by trepanning or other machining operation, to define the cylindrical post 23.

The external periphery of the cylindrical blank 94 is also shaped as desired, including formation of external threads 102 at the rear end 19 of the holder 16. Finally, the front face 95 of the blank 94 and the end faces 29 and 36 of the emissive element 28 and separator 32, respectively, are machined so that they are substantially flat and flush with one another.

FIG. 11 depicts an end elevational view of the holder 16. It can be seen that the end face 36 of the separator 32 separates the end face 29 of the emissive element 28 from the front face 20 of the holder 16. The end face 36 is annular having an inner perimeter 104 and an outer perimeter 106. The separator 32 serves to discourage the arc from detaching from the emissive element and becoming attached to the holder 16.

Thus, the present invention provides an electrode 14 for use in a plasma arc torch and a method of making an electrode wherein a plurality of thermal conductive paths 90 are formed within the emissive element 28 to the separator 32 to improve the thermal and electrical conductivity of the electrode. By using powdered materials to form the emissive element 28, the thermal conductive paths 90 can be formed during a diffusion bonding process by heating the powdered materials. In addition, by using a separator 32, the fabrication costs of the electrode decreases by limiting the use of relatively expensive materials, such as silver, to the separator, while allowing for a less expensive material, such as copper, to be used for the holder 16. Furthermore, the use of the silver separator 32 increases the life span of the electrode 14 when using powdered materials to form the emissive element 28 compared to using powdered materials compressed only in a copper holder.

That which is claimed:

1. An electrode adapted for supporting an arc in a plasma arc torch, comprising:

a holder having a front end defining a receptacle;

a separator positioned in the receptacle defined by the front end of the holder, said separator being comprised of a relatively non-emissive, electrically and thermally conductive material; and an emissive element also positioned in the receptacle of the holder such that the separator is disposed between the emissive element and the holder at the front end of the holder, said emissive element being comprised of at least two materials having distinct phases, including;

a first material that is emissive, and a second material that is electrically and thermally conductive, at least part of the phase of the second material being heated within the emissive element before use of the electrode to form thermal conductive paths from within the emissive element to the separator so as to conduct heat generated by the arc from the emissive element to the separator.

2. An electrode according to claim 1, wherein the first material of the emissive element is comprised of at least one material selected from the group consisting of hafnium, zirconium, tungsten, and combinations thereof, and wherein the second material of the emissive element is comprised of at least one material selected from the group consisting of silver, gold, platinum, aluminum, rhodium, iridium, palladium, nickel, and combinations thereof.

3. An electrode according to claim 1, wherein the first material comprises hafnium and the second material comprises silver.

4. An electrode according to claim 1, wherein the holder is comprised of copper.

5. An electrode according to claim 1, wherein the emissive element includes a dopant selected from the group consisting of lanthanum oxide, cerium oxide, yttrium oxide, calcium oxide, strontium oxide, barium oxide, and mixtures thereof.

6. An electrode adapted for supporting an arc in a plasma arc torch, comprising:

a holder having a front end defining a receptacle;

a separator positioned in the receptacle defined by the front end of the holder, said separator being comprised of a relatively non-emissive, electrically and thermally conductive material that is comprised in at least a major portion by a metal; and an emissive element also positioned in the receptacle of the holder such that the separator is disposed between the emissive element and the holder at the front end of the holder, said emissive element being comprised of at least two materials having distinct phases, including;

a first material that is emissive, and a second material that is electrically and thermally conductive, at least part of the phase of the second material being heated within the emissive element before use of the electrode to form thermal conductive paths from within the emissive element to the separator so as to conduct heat generated by the arc from the emissive element to the separator, wherein the second material is comprised in at least a major portion by a metal that is the same as the metal of the material forming the separator.

7. An electrode according to claim 6, wherein the first material of the emissive element is comprised of at least one material selected from the group consisting of hafnium, zirconium, tungsten, and combinations thereof, and wherein the second material of the emissive element is comprised of at least one material selected from the group consisting of silver, gold, platinum, aluminum, rhodium, iridium, palladium, nickel, and combinations thereof.

8. An electrode adapted for supporting an arc in a plasma arc torch, comprising:

a holder having a front end defining a receptacle;

a separator positioned in the receptacle defined by the front end of the holder, said separator being comprised of a substantially non-emissive, electrically and thermally conductive material that is comprised in at least a major portion by a metal; and an emissive element also positioned in the receptacle of the holder such that the separator is disposed between the emissive element and the holder at the front end of the holder, said emissive element being comprised of at least two materials, including;

a first material that is emissive, and a second material comprised in at least a major portion by a metal that is the same as the metal of the material forming the separator so as to conduct heat generated by the arc from the emissive element to the separator.

9. An electrode according to claim 8, wherein the first material of the emissive element is comprised of at least one material selected from the group consisting of hafnium, zirconium, tungsten, and combinations thereof, and wherein the second material of the emissive element is comprised of at least one material selected from the group consisting of silver, gold, platinum, rhodium, aluminum, iridium, palladium, nickel, and combinations thereof.

10. An electrode according to claim 8, wherein the first material comprises hafnium and the second material comprises silver.

11. An electrode according to claim 8, wherein the first and second materials of the emissive element have distinct phases, and at least part of the phase of the second material is arranged within the emissive element to form thermal conductive paths from within the emissive element to the separator.

12. An electrode according to claim 11, wherein the second material is arranged within the emissive element to form electrical conductive paths from within the emissive element to the separator.

13. An electrode according to claim 8, wherein the holder is comprised of copper.

14. An electrode according to claim 8, wherein the emissive element includes a dopant selected from the group consisting of lanthanum oxide, cerium oxide, yttrium oxide, calcium oxide, strontium oxide, barium oxide, and mixtures thereof.

15. An electrode subassembly adapted for supporting an arc in a plasma arc torch, comprising:

a separator comprised of a substantially non-emissive and thermally conductive material, the separator defining an opening; and an emissive element positioned in the opening of the separator, said emissive element being comprised of at least two materials having distinct phases, including;

a first material that is emissive, and a second material that is thermally conductive, at least part of the phase of the second material being heated within the emissive element before use of the electrode to form thermal conductive paths from within the emissive element to the separator so as to conduct heat generated by the arc from the emissive element to the separator.

16. An electrode subassembly according to claim 15, wherein the separator and the second material are both comprised by a major portion of the same metal.

17. A method of forming an electrode for use in a plasma arc torch, comprising:

mixing together powders of at least two different materials including a first material that is emissive and a second material;

disposing the mixture within an opening in a separator that is comprised of a substantially non-emissive, electrically and thermally conductive material; and heating the mixture of powder materials to define a unitary emissive element bonded to the separator.

18. A method according to claim 17, further comprising compressing the powdered mixture to not less than 60% of theoretical density before said heating step.

19. A method according to claim 17, further comprising selecting the first material of the emissive element from at least one material of the group consisting of hafnium, zirconium, tungsten, and combinations thereof, and selecting the second material of the emissive element from at least one material of the group consisting of silver, gold, platinum, rhodium, iridium, palladium, nickel, aluminum, and combinations thereof.

20. A method according to claim 17, wherein the first material comprises hafnium and the second material comprises silver, and wherein said heating step comprises heating the mixture to approximately 1400° F.

21. A method according to claim 17, wherein the heating step causes the first and second materials to have distinct phases wherein at least part of the phase of the second material is arranged within the emissive element to form thermal conductive paths from within the emissive element to the separator.

22. A method according to claim 21, wherein the second material and the material comprising the separator are both comprised by a major portion of the same metal so that the thermal conductive paths are bonded at one end to the separator.

23. A method according to claim 17, further comprising the step of positioning the separator and emissive element into a holder.

24. A method according to claim 17, wherein said mixing step further comprises mixing in a dopant selected from the group consisting of lanthanum oxide, cerium oxide, yttrium oxide, calcium oxide, strontium oxide, barium oxide, and mixtures thereof.

25. An electrode adapted for supporting an arc in a plasma torch, comprising:

a holder defining a longitudinal axis;

a relatively non-emissive member secured to the holder and disposed coaxially along the longitudinal axis, the non-emissive member defining an opening at least partially therethrough; and an emissive element disposed within the opening defined by the non-emissive member, the emissive element being comprised of at least two materials having distinct phases, including;

a first material that is emissive, and a second material that is electrically and thermally conductive, at least part of the phase of the second material being heated within the emissive element before use of the electrode to form thermal conductive paths from within the emissive element to the non-emissive member so as to conduct heat generated by the arc from the emissive element to the non-emissive member.

26. An electrode according to claim 25, wherein the first material of the emissive element is comprised of at least one material selected from the group consisting of hafnium, zirconium, tungsten, and combinations thereof, and wherein the second material of the emissive element is comprised of at least one material selected from the group consisting of silver, gold, platinum, aluminum, rhodium, iridium, palladium, nickel, and combinations thereof.

27. An electrode according to claim 25, wherein the first material comprises hafnium and the second material comprises silver.

28. An electrode according to claim 25, wherein the holder is comprised of copper.

29. An electrode according to claim 25, wherein the emissive element includes a dopant selected from the group consisting of lanthanum oxide, cerium oxide, yttrium oxide, calcium oxide, strontium oxide, barium oxide, and mixtures thereof.

* * * * *